(12) United States Patent
Hughes et al.

(10) Patent No.: US 11,668,269 B2
(45) Date of Patent: Jun. 6, 2023

(54) EGR PUMP SYSTEM AND CONTROL METHOD OF EGR PUMP

(71) Applicant: EATON INTELLIGENT POWER LIMITED, Dublin (IE)

(72) Inventors: Douglas Anthony Hughes, Novi, MI (US); Brandon Dennis Biller, Ferndale, MI (US); Jim Kevin Spring, Brighton, MI (US); Jesse Drummond, Rochester Hills, MI (US); Matthew Fortini, Fivonia, MI (US)

(73) Assignee: Eaton Intelligent Power Limited, Dublin (IE)

( * ) Notice: Subject to any disclaimer, the term of this patent is extended or adjusted under 35 U.S.C. 154(b) by 210 days.

(21) Appl. No.: 16/962,459

(22) PCT Filed: Jan. 17, 2019

(86) PCT No.: PCT/EP2019/051132
§ 371 (c)(1),
(2) Date: Jul. 15, 2020

(87) PCT Pub. No.: WO2019/141767
PCT Pub. Date: Jul. 25, 2019

(65) Prior Publication Data
US 2021/0071667 A1    Mar. 11, 2021

Related U.S. Application Data

(60) Provisional application No. 62/736,161, filed on Sep. 25, 2018, provisional application No. 62/733,340, (Continued)

(51) Int. Cl.
*F02M 26/49*    (2016.01)
*F02M 26/34*    (2016.01)
(Continued)

(52) U.S. Cl.
CPC ............ *F02M 26/49* (2016.02); *F02B 1/14* (2013.01); *F02B 3/06* (2013.01); *F02B 33/34* (2013.01);
(Continued)

(58) Field of Classification Search
CPC .. F02M 26/49; F02M 2026/004; F02M 26/05; F02M 26/47; F02M 26/33;
(Continued)

(56) References Cited

U.S. PATENT DOCUMENTS 4,485,794 A * 12/1984 Kimberley .......... F02D 41/1466
                                                    123/681
6,435,166 B1 * 8/2002 Sato ...................... F02M 26/05
                                                    123/568.21
(Continued)

FOREIGN PATENT DOCUMENTS

EP    2096295 A1    9/2009
GB    2540834 A     2/2017
(Continued)

OTHER PUBLICATIONS

International Search Report and Written Opinion dated Jul. 22, 2019 for Application No. PCT/EP2019/051132.

*Primary Examiner* — Peter J Bertheaud
(74) *Attorney, Agent, or Firm* — Merchant & Gould P.C.

(57) ABSTRACT

A method of operating an exhaust gas recirculation pump for an internal combustion engine including: providing an EGR pump assembly including an electric motor coupled to a roots device having rotors, the EGR pump operably connected to an internal combustion engine; providing an EGR control unit lined to the EGR pump assembly; providing sensors linked to the EGR control unit; determining if a motor speed is within a predetermined target (step SI), wherein when the motor speed is within the predetermined
(Continued)

target then; determining if a motor torque is within a predetermined target (step S2) wherein when the motor torque is within the predetermined target then; determining if a motor temperature is within a predetermined target (step S3) wherein when the motor temperature is within the predetermined target then; maintaining operation of the exhaust gas recirculation pump.

17 Claims, 19 Drawing Sheets

Related U.S. Application Data filed on Sep. 19, 2018, provisional application No. 62/674,872, filed on May 22, 2018, provisional application No. 62/662,521, filed on Apr. 25, 2018, provisional application No. 62/660,497, filed on Apr. 20, 2018, provisional application No. 62/629,461, filed on Feb. 12, 2018, provisional application No. 62/618,412, filed on Jan. 17, 2018.

(51) Int. Cl.

| | | |
|---|---|---|
| *F04C 28/06* | (2006.01) | |
| *F04C 28/08* | (2006.01) | |
| *F04C 18/12* | (2006.01) | |
| *F02M 26/33* | (2016.01) | |
| *F02M 26/05* | (2016.01) | |
| *F02M 26/47* | (2016.01) | |
| *F02M 26/50* | (2016.01) | |
| *F02D 41/00* | (2006.01) | |
| *F02B 1/14* | (2006.01) | |
| *F02B 3/06* | (2006.01) | |
| *F02B 33/38* | (2006.01) | |
| *F02B 39/10* | (2006.01) | |
| *F02B 33/34* | (2006.01) | |
| *F04C 18/14* | (2006.01) | |
| *F04C 29/02* | (2006.01) | |
| *F04C 29/04* | (2006.01) | |
| *F02M 26/00* | (2016.01) | |

(52) U.S. Cl.
CPC .............. *F02B 33/38* (2013.01); *F02B 39/10* (2013.01); *F02D 41/006* (2013.01); *F02D 41/0007* (2013.01); *F02D 41/0065* (2013.01); *F02M 26/05* (2016.02); *F02M 26/33* (2016.02); *F02M 26/34* (2016.02); *F02M 26/47* (2016.02); *F02M 26/50* (2016.02); *F04C 18/126* (2013.01); *F04C 28/06* (2013.01); *F04C 28/08* (2013.01); *F02M 26/00* (2016.02); *F02M 2026/004* (2016.02); *F04C 18/14* (2013.01); *F04C 29/02* (2013.01); *F04C 29/04* (2013.01); *Y02T 10/12* (2013.01); *Y02T 10/40* (2013.01)

(58) Field of Classification Search
CPC ........ F02M 26/50; F02M 26/34; F02M 26/00; F02D 41/0007; F02D 41/0065; F02D 41/006; F02B 33/38; F02B 33/34; F02B 1/14; F02B 39/10; F02B 3/06; Y02T 10/40; Y02T 10/12; F04C 18/126; F04C 28/06; F04C 28/08; F04C 18/14
See application file for complete search history.

(56) References Cited

U.S. PATENT DOCUMENTS

| | | | |
|---|---|---|---|
| 6,446,498 | B1 | 9/2002 | Schricker et al. |
| 6,990,949 | B2 * | 1/2006 | Kataoka ................ F02D 41/402 |
| | | | 123/305 |
| 2018/0045109 | A1 * | 2/2018 | Fortini ................ F02D 41/0087 |

FOREIGN PATENT DOCUMENTS

| | | |
|---|---|---|
| JP | 2010151102 A | 8/2010 |
| JP | 2014122575 A | 7/2014 |
| JP | 2015206275 A | 11/2015 |

\* cited by examiner

EGR PUMP SYSTEM AND CONTROL METHOD OF EGR PUMP

CROSS-REFERENCE TO RELATED APPLICATIONS

This application claims priority to U.S. provisional application No. 62/618,412 filed on Jan. 17, 2018, U.S. provisional application No. 62/629,461 filed on Feb. 12, 2018, U.S. provisional application No. 62/662,521 filed on Apr. 25, 2018, U.S. provisional application No. 62/660,497 filed on Apr. 20, 2018, U.S. provisional application No. 62/674,872 filed on May 22, 2018, U.S. provisional application No. 62/736,161 filed on Sep. 25, 2018, U.S. provisional application No. 62/733,340 filed on Sep. 19, 2018 which are incorporated herein by reference in their entirety.

FIELD OF THE INVENTION

The invention relates to exhaust gas recirculation (EGR) pumps and control of EGR pumps.

BACKGROUND OF THE INVENTION

There are many previously known automotive vehicles that utilize internal combustion engines such as diesel, gas or two stroke engines to propel the vehicle. In some constructions EGR (exhaust gas recirculation) recirculates the exhaust gas into the engine for mixture with the cylinder charge. The EGR that is intermixed with the air and fuel to the engine enhances the overall combustion of the fuel. This, in turn, reduces exhaust gas emissions.

By including a separate EGR pump an increase in fuel economy may be achieved in comparison to prior art systems that may use a turbocharger to drive an EGR flow with the addition of costly EGR valves. Additionally, a separate EGR pump provides full authority of the EGR flow rate. In a diesel application, a separate EGR pump may allow for removal of an EGR valve and replace a complicated variable geometry turbocharger with a fixed geometry turbocharger optimized for providing a boosted air charge. The separate EGR pump may provide reduced engine pumping work and improved fuel economy.

One disadvantage of intermixing exhaust gas is that the exhaust gas contains particulate matter such as soot. Water vapor may be included in exhaust gases from an engine as a result of the combustion process of fuel supplied to the engine. Generally, the water vapor is expelled to the environment through an exhaust system. However in an EGR application a portion of the exhaust is recirculated to the engine intake manifold. The water vapor may provide a carrier for particulate matter such as soot. Soot deposits may accumulate on various components degrading performance.

It is therefore desirable to provide an EGR pump that resists accumulation of soot deposits. It is also desirable to provide a separate EGR pump that transports EGR gases to prevent degradation of the additional components such as a supercharger or turbocharger.

Various portions of EGR pumps may be exposed to exhaust gases at elevated temperatures. For example the rotors associated with the pump may contact exhaust gases at temperatures such as from 220 to 300 C. In such a scenario, the high temperature may demagnetize the components of the electric motor causing a loss of torque. Additionally, the high temperature may adversely affect the mechanical components of the EGR pump such as varying the heat treatments and properties of the materials.

It is therefore desirable to reduce heat transfer from the EGR pump rotors to the electric motor that drives the EGR pump. There is therefore a need in the art to thermally isolate rotors of an EGR pump from an electric motor that may drive the pump such that the motor does not overheat.

Further, it is desirable to cool and lubricate the various components of the EGR pump for safe and long operation in an EGR environment.

SUMMARY OF THE INVENTION

In one aspect there is disclosed, a method of operating exhaust gas recirculation pump for an internal combustion engine including: providing an EGR pump assembly including an electric motor coupled to a roots device having rotors, the EGR pump operably connected to an internal combustion engine; providing an EGR control unit linked to the EGR pump assembly; providing sensors linked to the EGR control unit; determining if a motor speed is within a predetermined target in step S1 wherein when motor speed=predetermined target then; determining if a motor torque is within a predetermined target in step S2 wherein when motor torque=predetermined target then; determining if a motor temperature is within a predetermined target in step S3 wherein when motor temperature=predetermined target then; and maintaining operation of the exhaust gas recirculation pump.

In another aspect there is disclosed, a method of operating exhaust gas recirculation pump for an internal combustion engine including: providing an EGR pump assembly including an electric motor coupled to a roots device having rotors, the EGR pump operably connected to an internal combustion engine; providing an EGR control unit linked to the EGR pump assembly; providing sensors linked to the EGR control unit; performing an engine shut down S14 and determining if the temperature is less than 5 degrees C. in step S15 wherein in step S15 the temperature is less than 5 degrees C. and including the step S16 of moving the rotors.

In a further aspect, there is disclosed a method of operating exhaust gas recirculation pump for an internal combustion engine including: providing an EGR pump assembly including an electric motor coupled to a roots device having rotors, the EGR pump operably connected to an internal combustion engine; providing an EGR control unit linked to the EGR pump assembly; providing sensors linked to the EGR control unit; and performing an engine start up S17 and the step S18 of determining if the toque is greater than the predetermined target.

DETAILED DESCRIPTION

Figure 1:
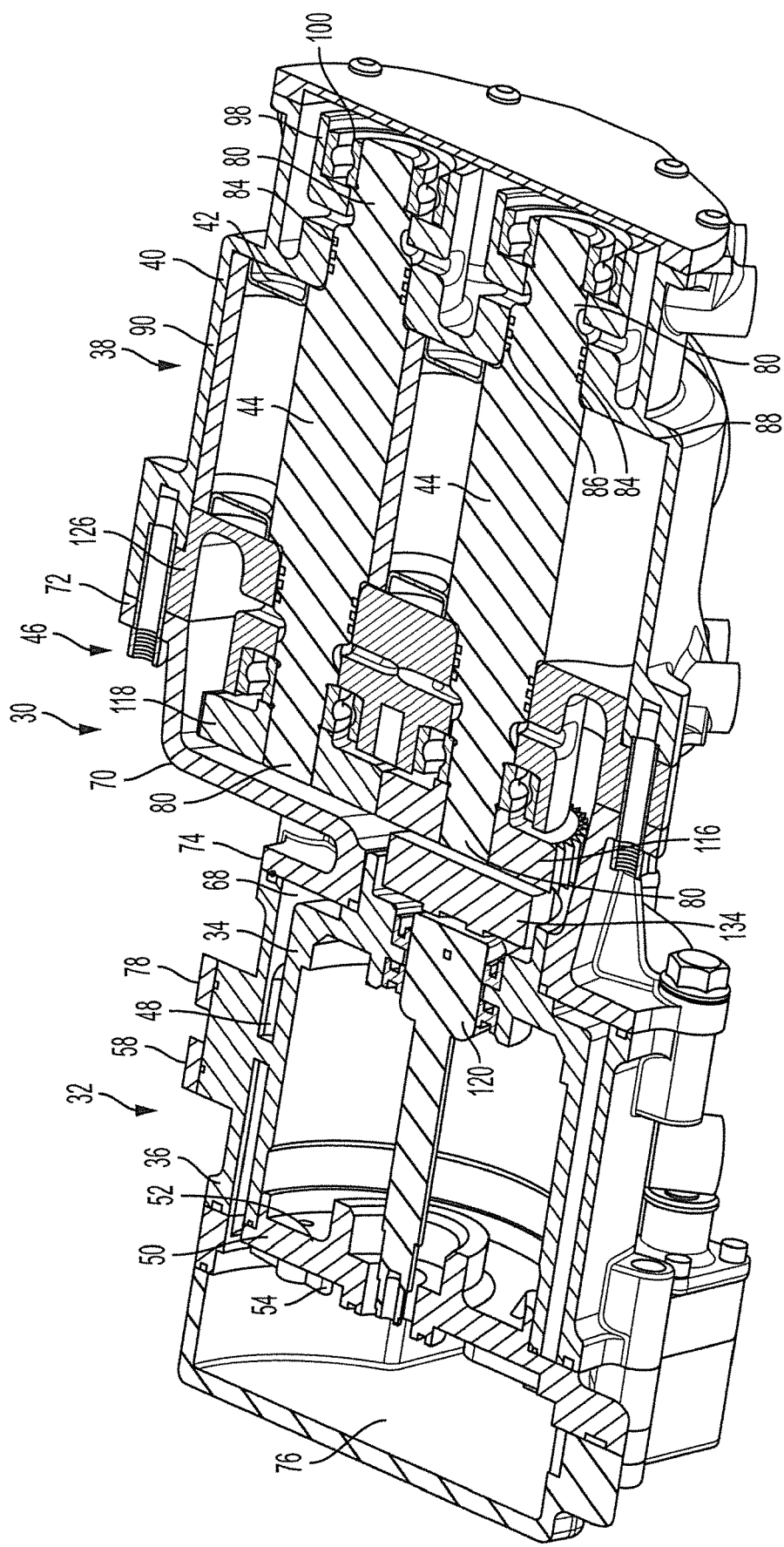
FIG. 1 is a partial sectional view of an EGR pump, transmission assembly and motor.
Figure 2:
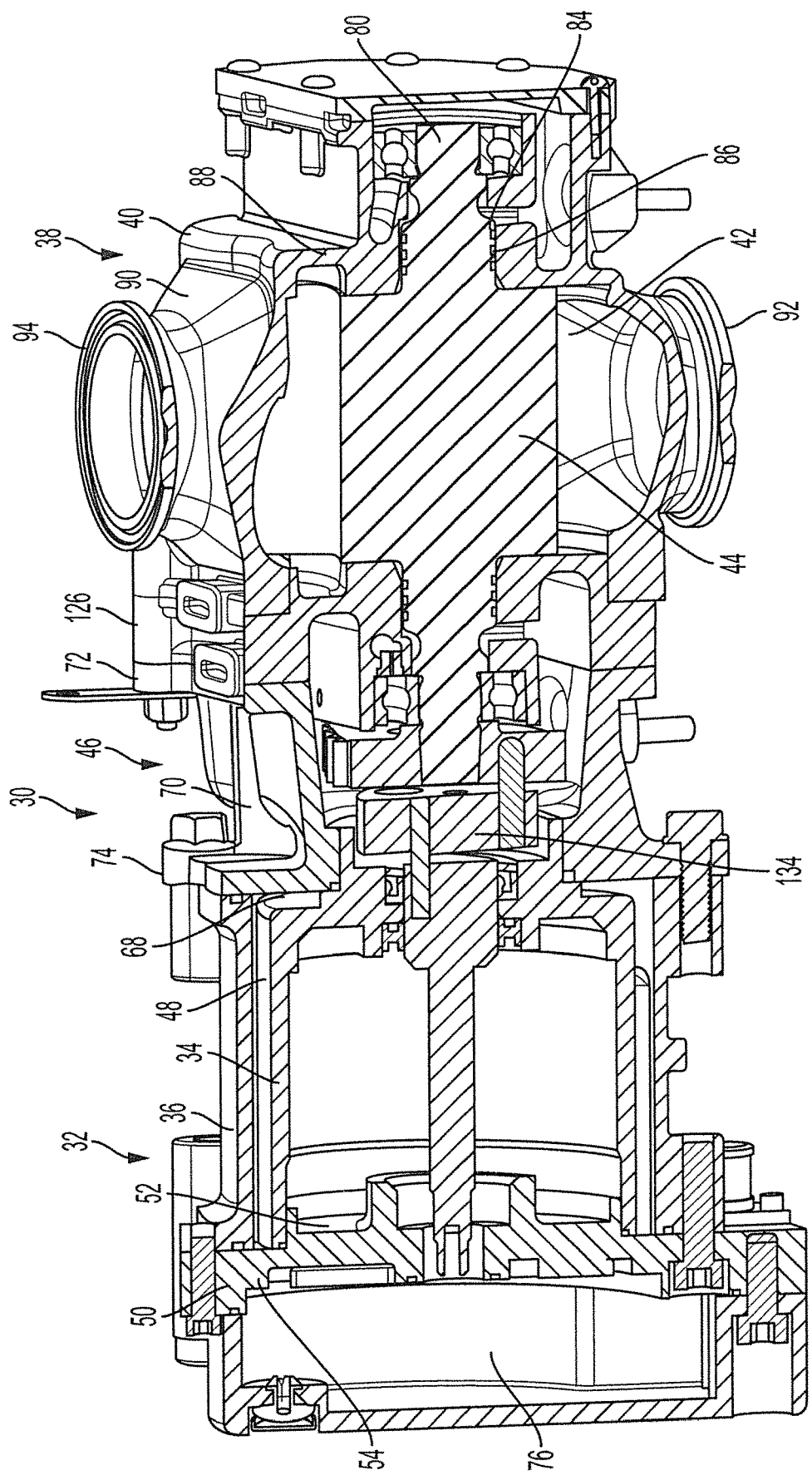
FIG. 2 is a partial sectional view of an EGR pump, transmission assembly and motor.
Figure 3:
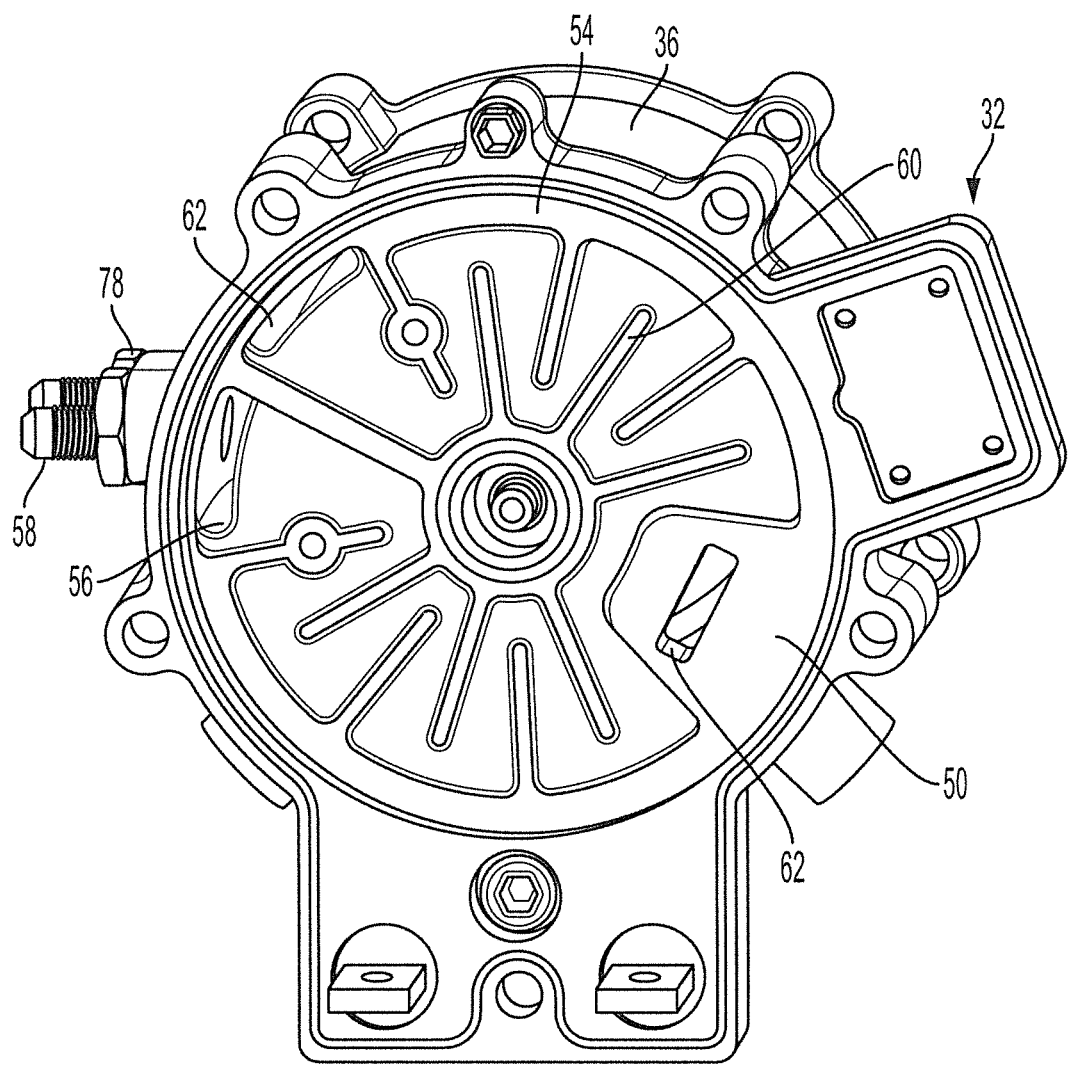
FIG. 3 is a partial perspective of an electric motor end plate and cooling path.
Figure 4:
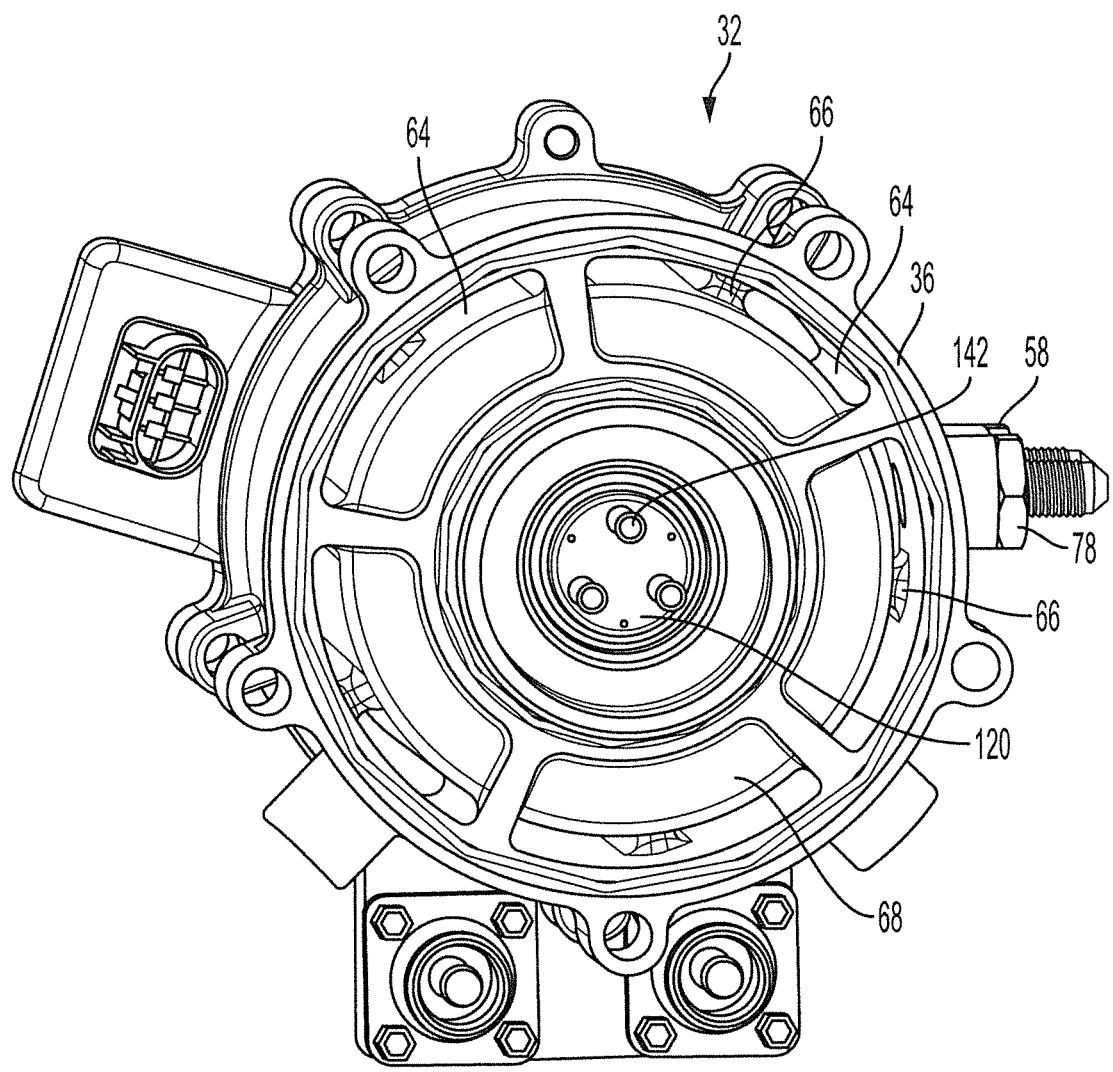
FIG. 4 is a partial perspective of an electric motor cooling path and cooling barrier.

Referring to FIGS. 1-2, there is shown an exhaust gas recirculation pump (EGR pump) system 30. The EGR pump system 30 includes an electric motor assembly 32 including an electric motor 34 disposed within an electric motor housing 36. A roots device 38 is coupled to the electric motor 34. The Roots device 38 includes a housing 40 that defines an internal volume 42. Rotors 44 are disposed in the internal volume 42 and are connected to the electric motor 34. The electric motor 34 may be linked with the rotors 44 by a transmission assembly 46.

The EGR pump system 30 may include a Roots device 38 and an electric motor 34 that may be utilized for engines to provide higher engine efficiency and improved control of engine emissions.

In one aspect, for diesel applications, the EGR pump system 30 enables higher engine efficiency by reducing engine pumping losses by enabling the use of a high-efficiency turbo with a lower exhaust backpressure in comparison to prior designs. The EGR pump system 30 provides more accurate EGR flow rate control for better combustion and emissions management. The EGR pump system 30 may provide cost benefits in comparison to a traditional EGR system by eliminating structures such as an EGR valve, variable geometry turbocharger and an intake throttle associated with such designs.

The function of the EGR pump system 30 is to deliver exhaust gas from an engine's exhaust manifold to its intake manifold at a rate that is variable and that is controlled. In order to pump exhaust gas, the EGR pump system 30 may use a Roots device 38 coupled to an electric motor 34 such as a 48V electric motor. The electric motor 34 provides control of EGR flow rate by managing the motor speed and in turn the pump speed and flow rate of exhaust gas.

Referring to FIGS. 1-4, the exhaust gas recirculation pump system 30 includes coolant path 48 and an electric motor housing 36 having an end plate 50 attached thereon.

The end plate 50 includes end plate inner and outer surfaces 52, 54. The end plate 50 includes a coolant inlet slot 56 formed therein extending between the end plate inner and outer surfaces 52, 54. The coolant inlet slot 56 is linked to a coolant inlet 58. The end plate 50 includes a coolant labyrinth 60 formed on the end plate outer surface 54. The labyrinth 60 extends from the coolant inlet slot 56 to at least one coolant outlet slot 62, with two shown in the figures. The electric motor housing 36 includes a plurality of coolant passages 64 formed therein along a longitudinal axis of the electric motor housing 36. The coolant passages 64 including baffle walls 66 formed therein directing a flow of coolant.

The electric motor housing 36 includes a coolant barrier cavity 68 formed therein on an end of the electric motor housing 36 proximate the housing 40 and Roots device 38. A gear box housing 70 having a cylindrical body extends from a housing flange 72 to an electric housing flange 74. The electric housing flange 74 is coupled to the electric motor housing 36 and the housing flange 72 is coupled to the housing 40. The electric motor housing 36 and electric housing flange 74 define the coolant barrier cavity 68. The coolant barrier cavity 68 isolates the electric motor 34 from potential heat of the exhaust gas that is contained in the housing 40.

The coolant path 48 is linked with an engine cooling path such as coolant from an engine radiator. The coolant enters at the coolant inlet 58 and enters the coolant inlet slot 56 to first cool an inverter 76 associated with the electric motor 34. The coolant is circulated in the coolant labyrinth 60 and exits the coolant outlet slots 62 to be circulated about the electric motor through the coolant passages 64. The coolant is also captured in the cooling barrier cavity 68 and acts to prevent heat being transferring from the housing 40. The coolant then exits at the coolant outlet 78 to return to the engine coolant circulation system.

Figure 5:
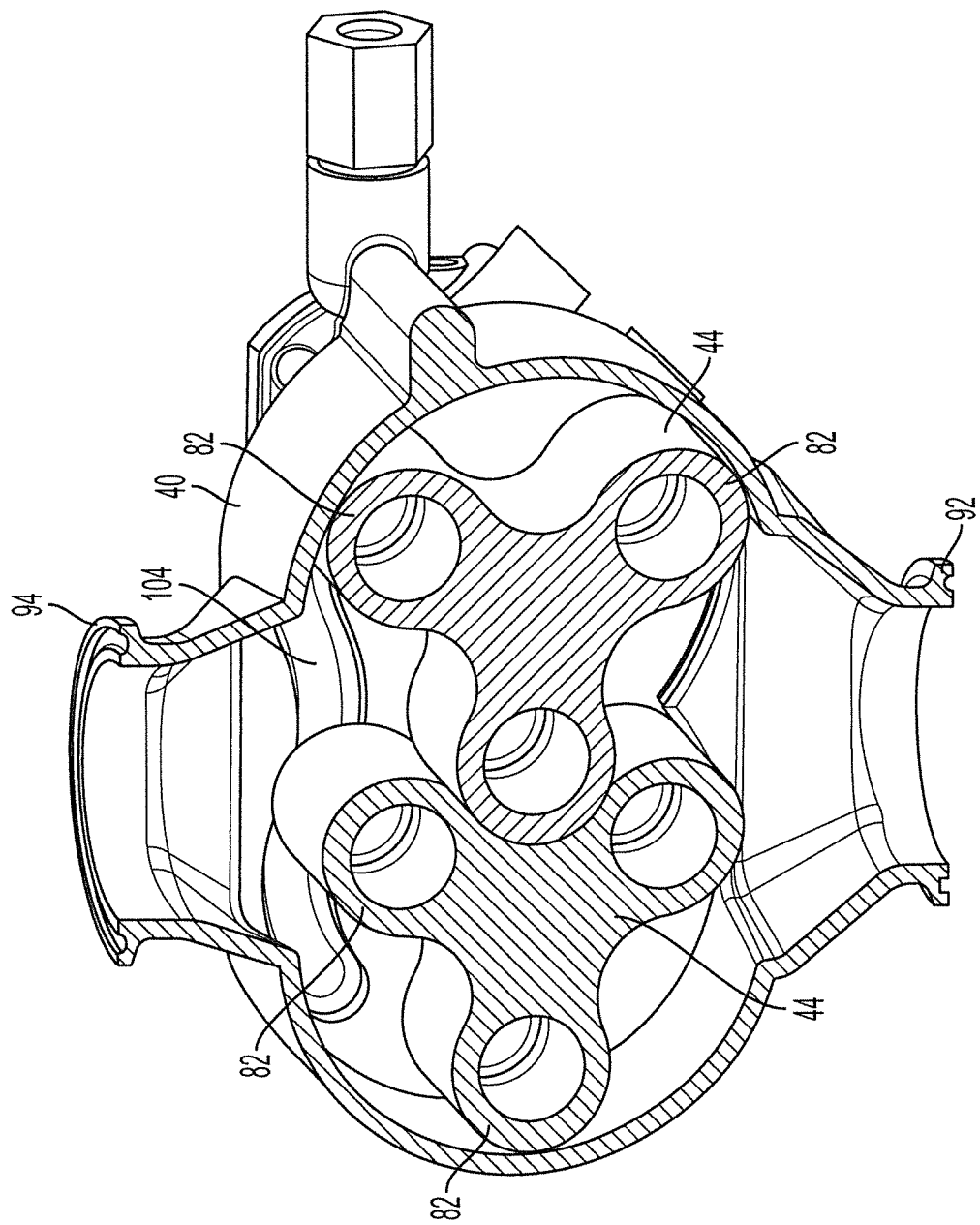
FIG. 5 is a partial perspective view of an EGR pump detailing rotor profiles and a back flow port.

Referring to FIG. 5, the exhaust gas recirculation pump system 30 includes rotors 44 disposed within the housing 40. The rotors 44 include a rotor shaft 80 having a plurality of lobes 82 formed thereon, the lobes 82 include a straight profile having a modified cycloidal geometry as disclosed in PCT application PCT/US16/47225 filed on Aug. 16, 2016, which is herein incorporated by reference. The modified cycloidal geometry includes a cycloid curve modified with at least two interpolated and stitched spline curves. The rotor lobe 82 profile further includes a flattened tip.

Referring to FIGS. 1-2, the rotor shaft 80 has a plurality of longitudinally spaced groves 84 formed on ends of the rotor shaft 80. The grooves 84 receive sealing rings 86.

Figure 6:
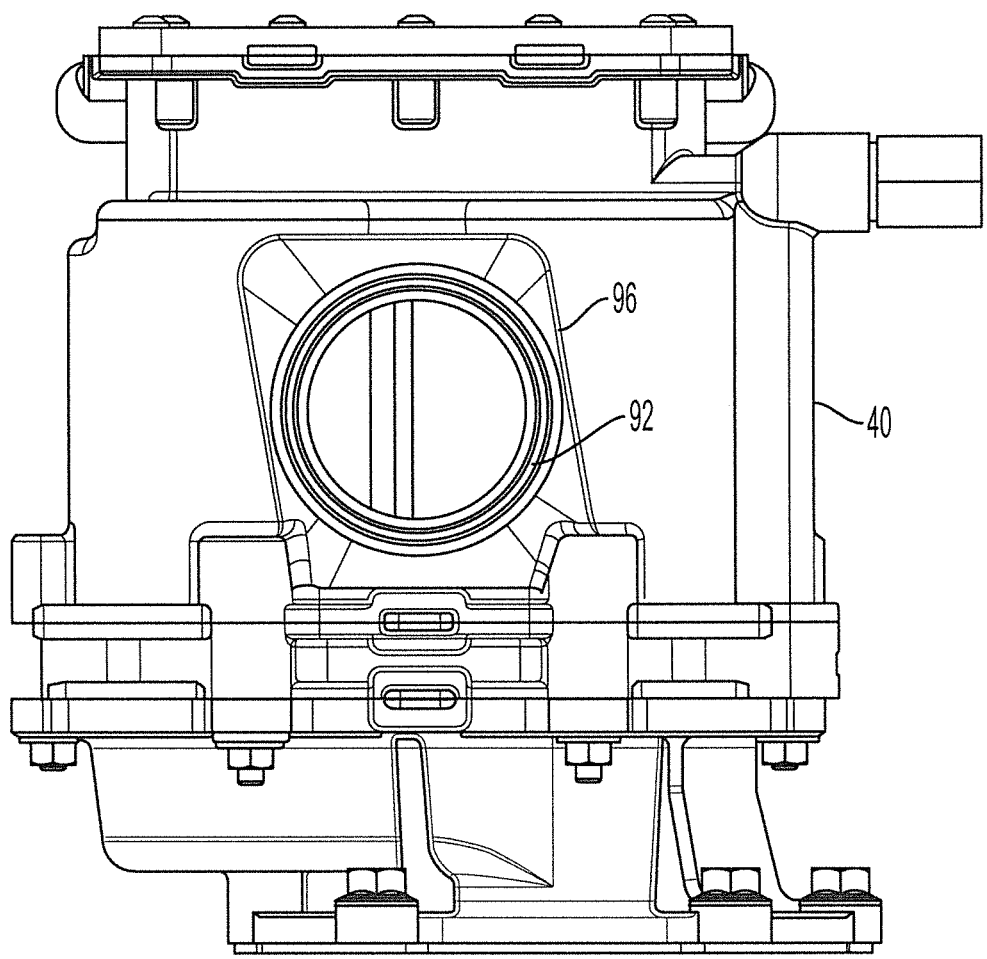
FIG. 6 is a partial perspective view of an EGR pump detailing an angled inlet.
Figure 7:
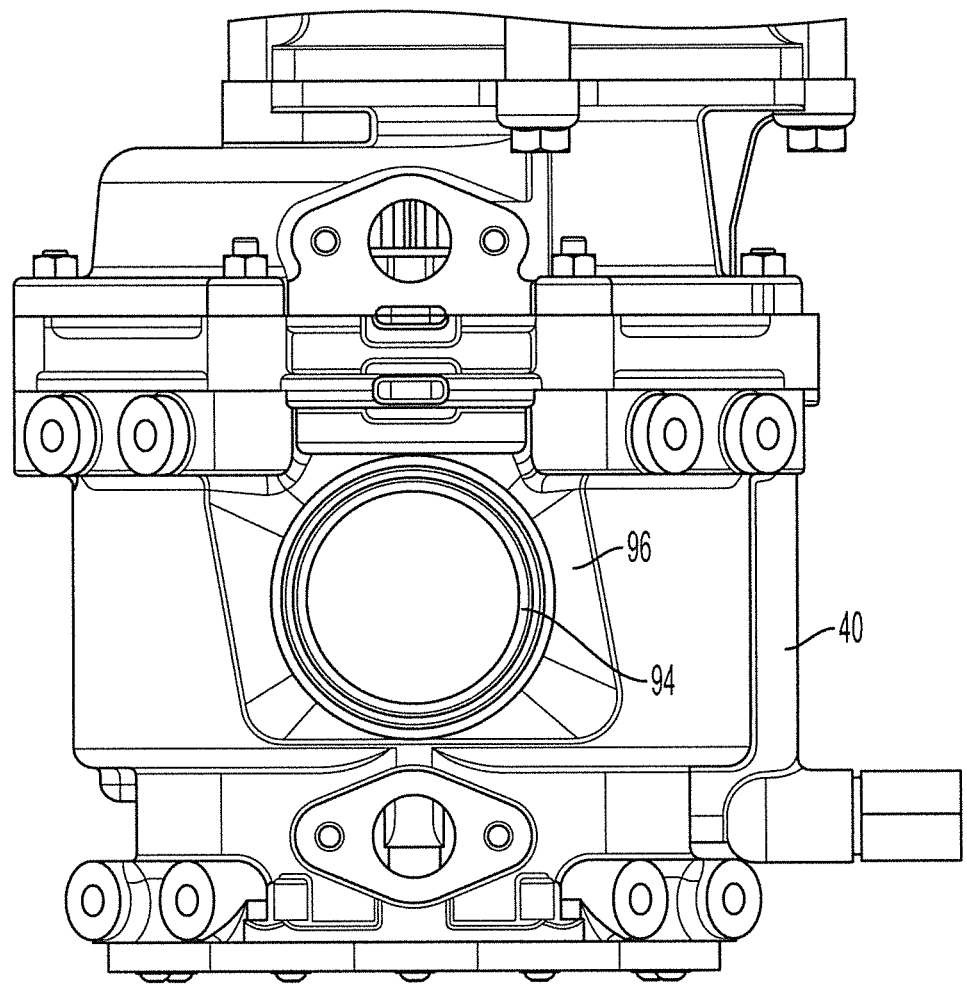
FIG. 7 is a partial perspective view of an EGR pump detailing an angled outlet.

Referring to FIGS. 1-2, the exhaust gas recirculation pump system 30 includes a housing 40 that defines an internal volume 42 that receives the rotors 44. The housing includes a generally elliptical shape that accommodates the lobes 82 of the rotors 44. The housing 40 includes a housing end face 88 linked with a housing side wall 90. The portion of the housing 40 opposite the end 88 face is open. The housing 40 includes radial inlet and outlet ports 92, 94 formed therein. The inlet port 92 and the outlet port 94 include an angled geometry 96 best shown in FIGS. 6 and 7. In the depicted embodiments, the angled geometry 96 is in the shape of a parallelogram. The parallelogram shape provides a gradual or regulated release of the carrier volume of exhaust gas to the outlet port 94. This results in reduced pulsations and potential noise, vibration and harshness (NVH).

Figure 8:
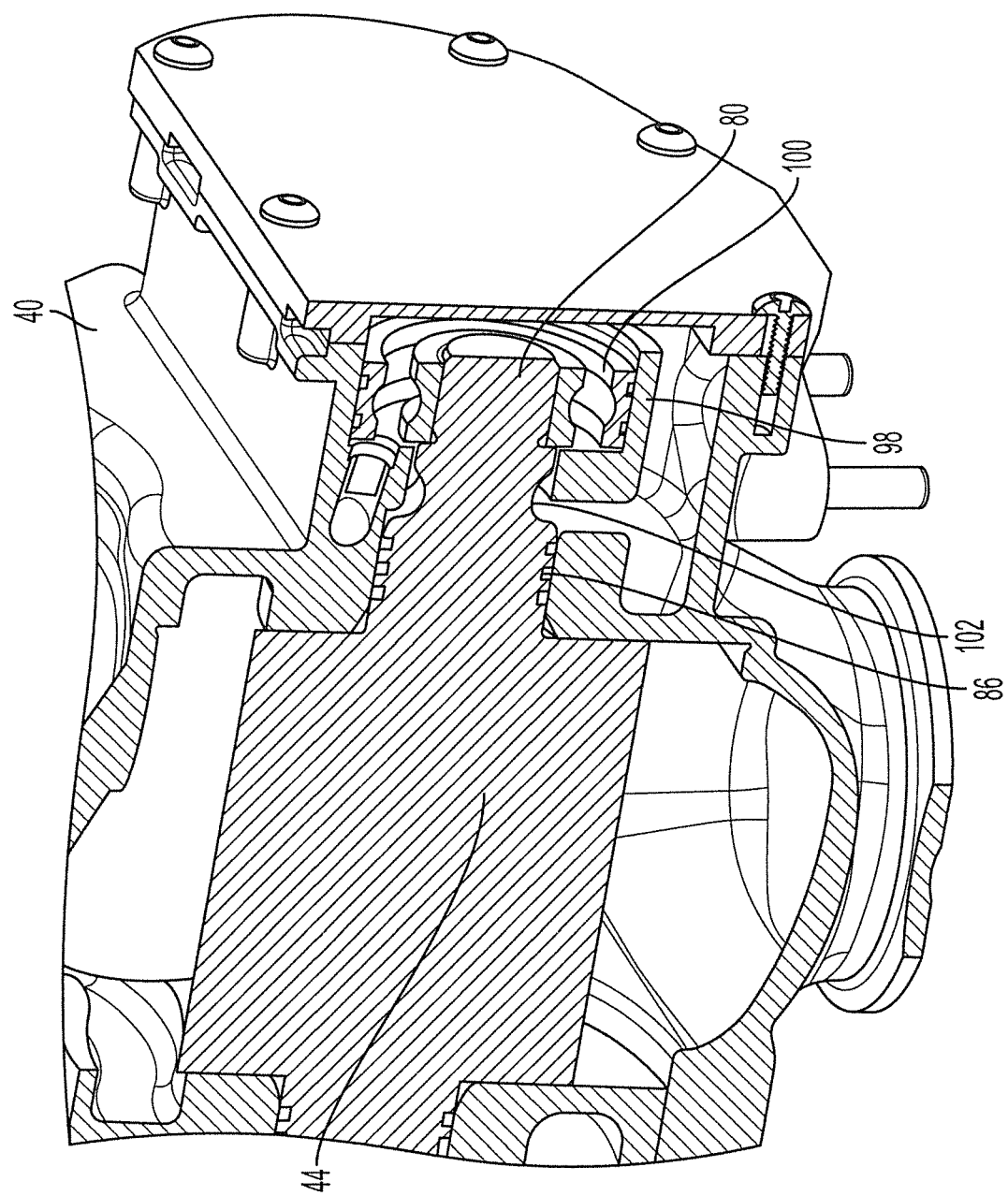
FIG. 8 is a partial sectional view of an EGR pump showing an oil slinger.
Figure 9:
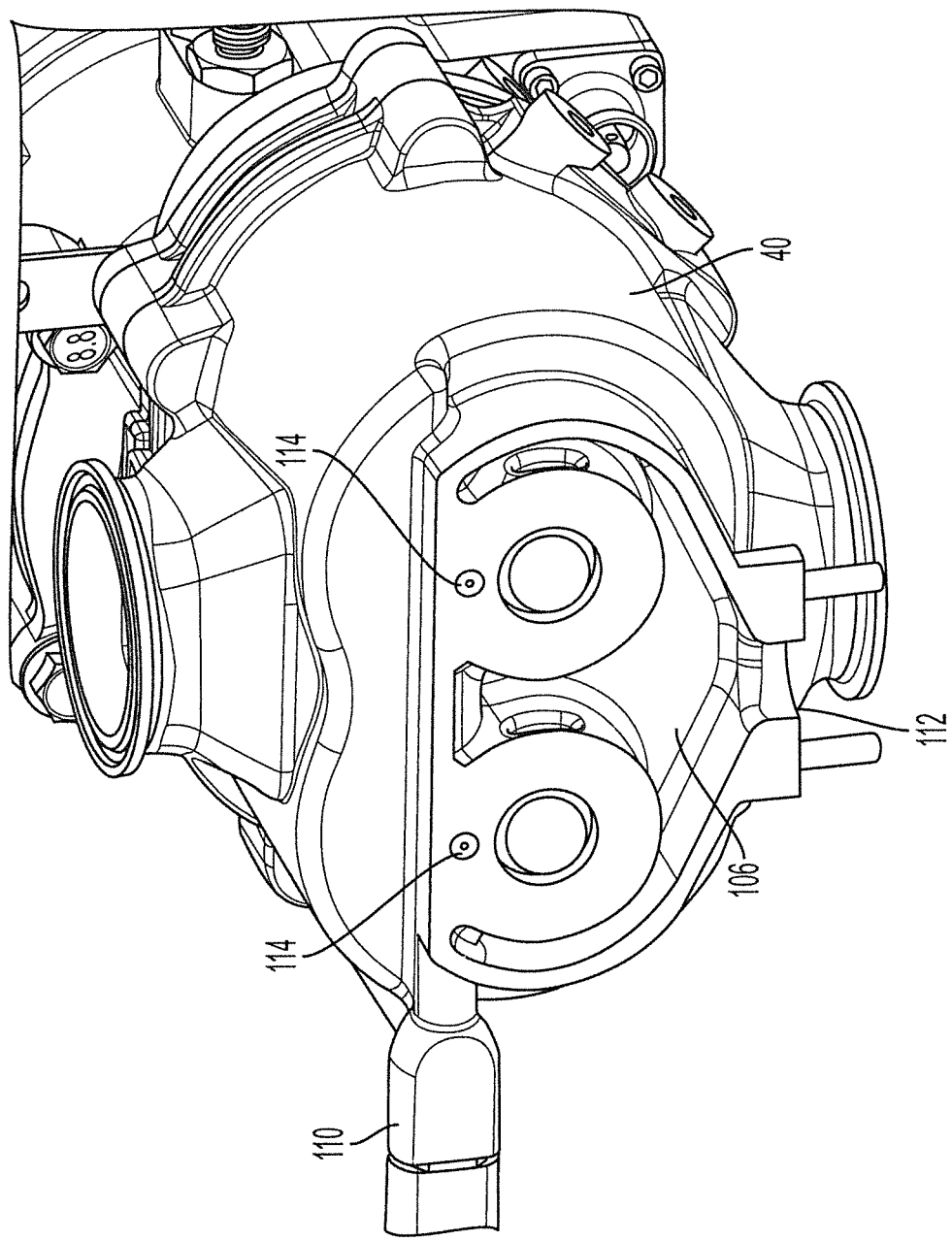
FIG. 9 is a partial perspective view of an EGR pump detailing an oil cavity.

Referring to FIGS. 1-2 and 8, the housing 40 includes journals 98 formed therein receiving bearings 100 that support the rotors 44. The housing 40 includes an oil slinger 102 positioned therein about the rotor shaft 80 directing oil away from the sealing rings 86.

The housing 40 includes a back flow port 104 formed therein facing a rotor end face, as best seen in FIG. 5. The back flow port 104 includes a curved profile. As the rotors rotate, the lobes 82 turn in opposite directions with very tiny clearances between each other and between the rotors 44 and the housing 40. As each lobe 82 passes air at the inlet port 92, a measured quantity of air is trapped between the lobes 82 and the housing 40. As the rotors continue to rotate, this amount of air is transported around the housing 40 to the outlet port 94. The back flow port 104 connects the trapped quantity of air with the outlet port 94 to reduce pulsations and potential noise, vibration and harshness (NVH).

Referring to FIGS. 1-2 and 9-10, the housing 40 includes an oil cavity 106 formed therein. The oil cavity 106 is linked with an oil path 108 formed in the housing 40. The oil path 108 includes oil inlets 110 extending to oil outlets 112. The oil inlets 110 and outlets 112 are coupled to an engine oil circulation system such that the oil path lubricates bearings 100 and a transmission assembly 46.

The oil path 108 includes selected orifices 114 disposed therein providing a selectable amount of oil to the bearings 100 and transmission assembly 46. In the depicted embodiment, selectable orifices 114 are positioned at each of the bearings 100, at the oil inlet 110 and at a selected location of the transmission assembly 46.

Figure 10:
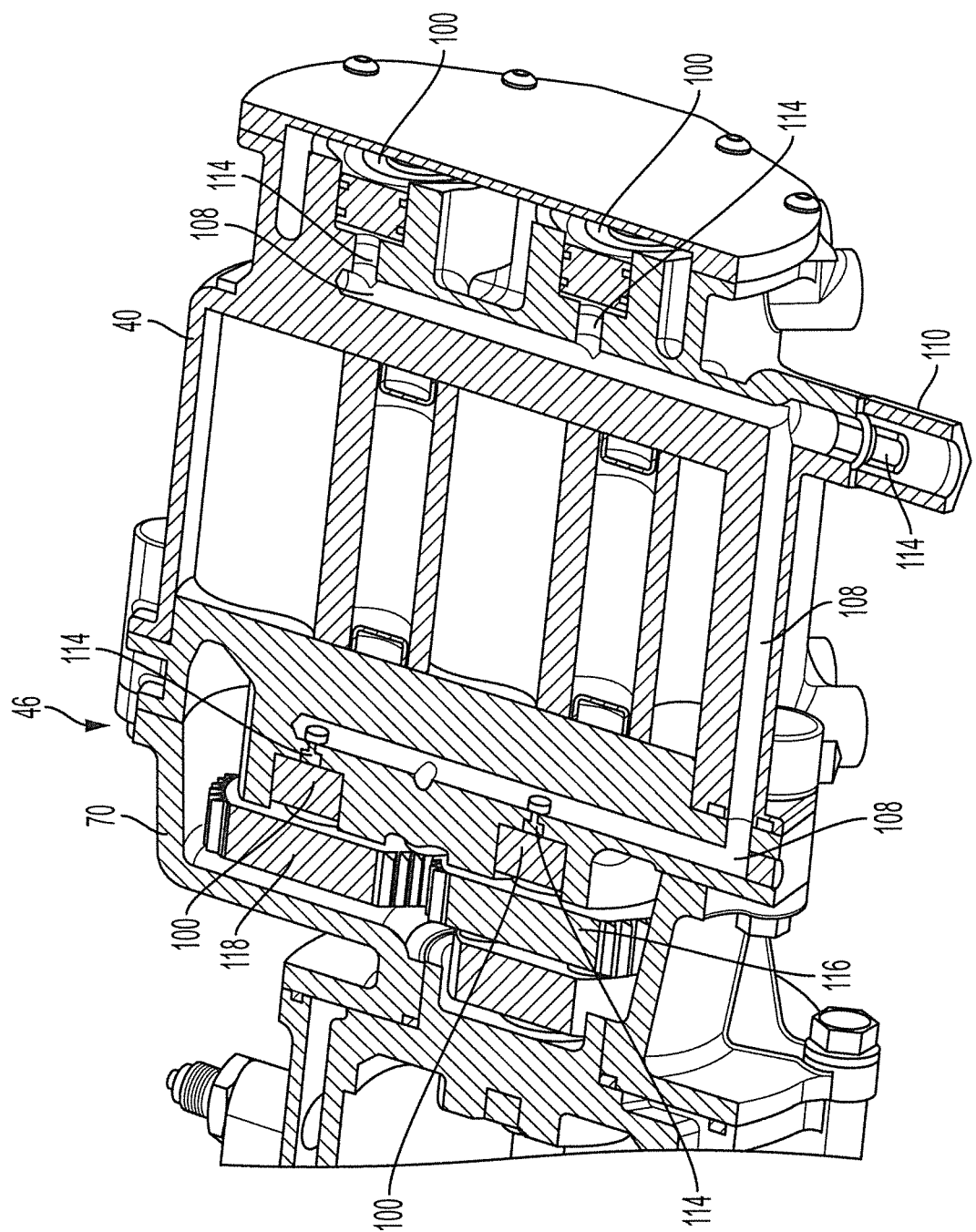
FIG. 10 is a partial sectional view of an EGR pump and transmission assembly showing an oil path.
Figure 14:
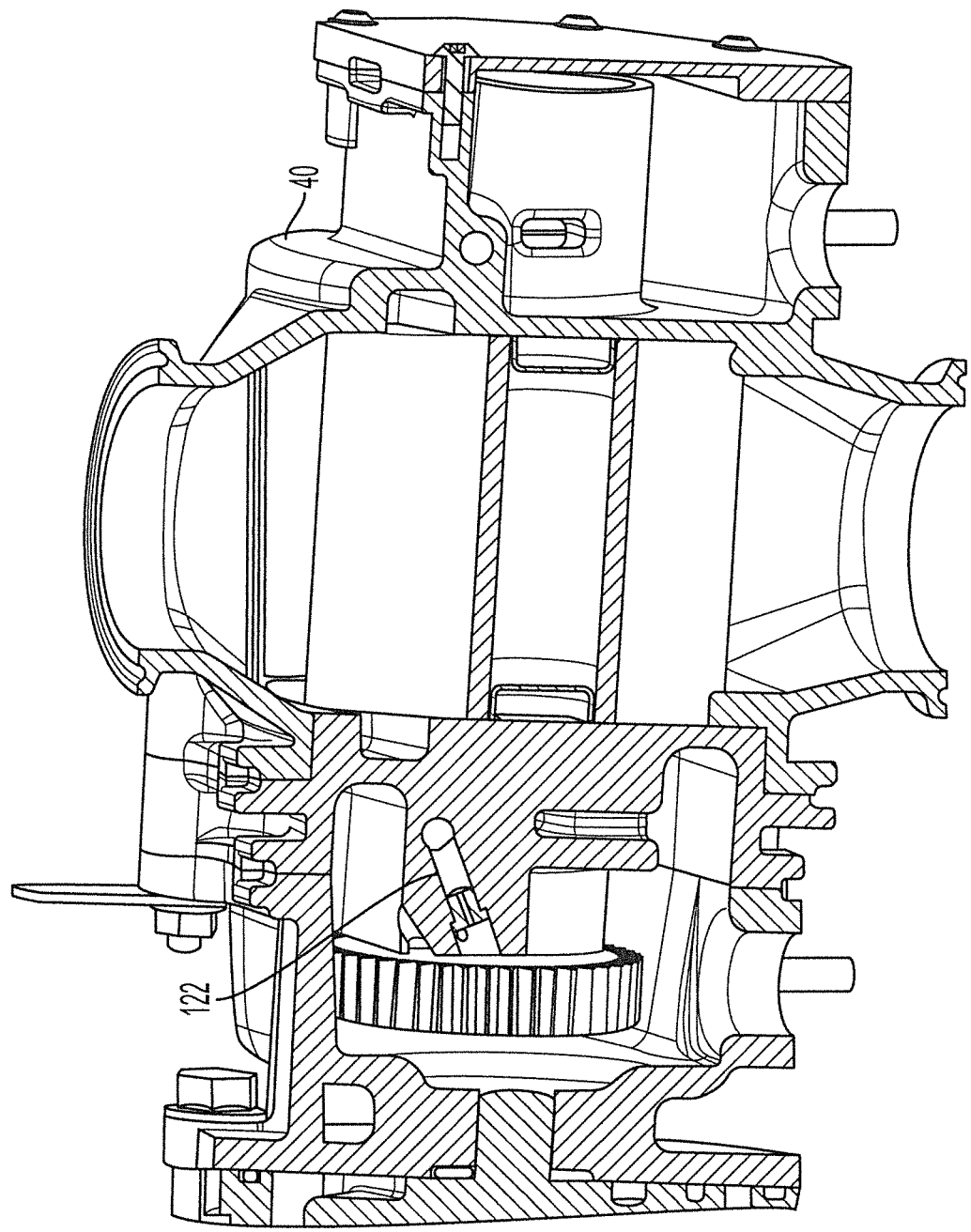
FIG. 14 is a partial sectional view of an EGR pump and transmission assembly.
Figure 15:
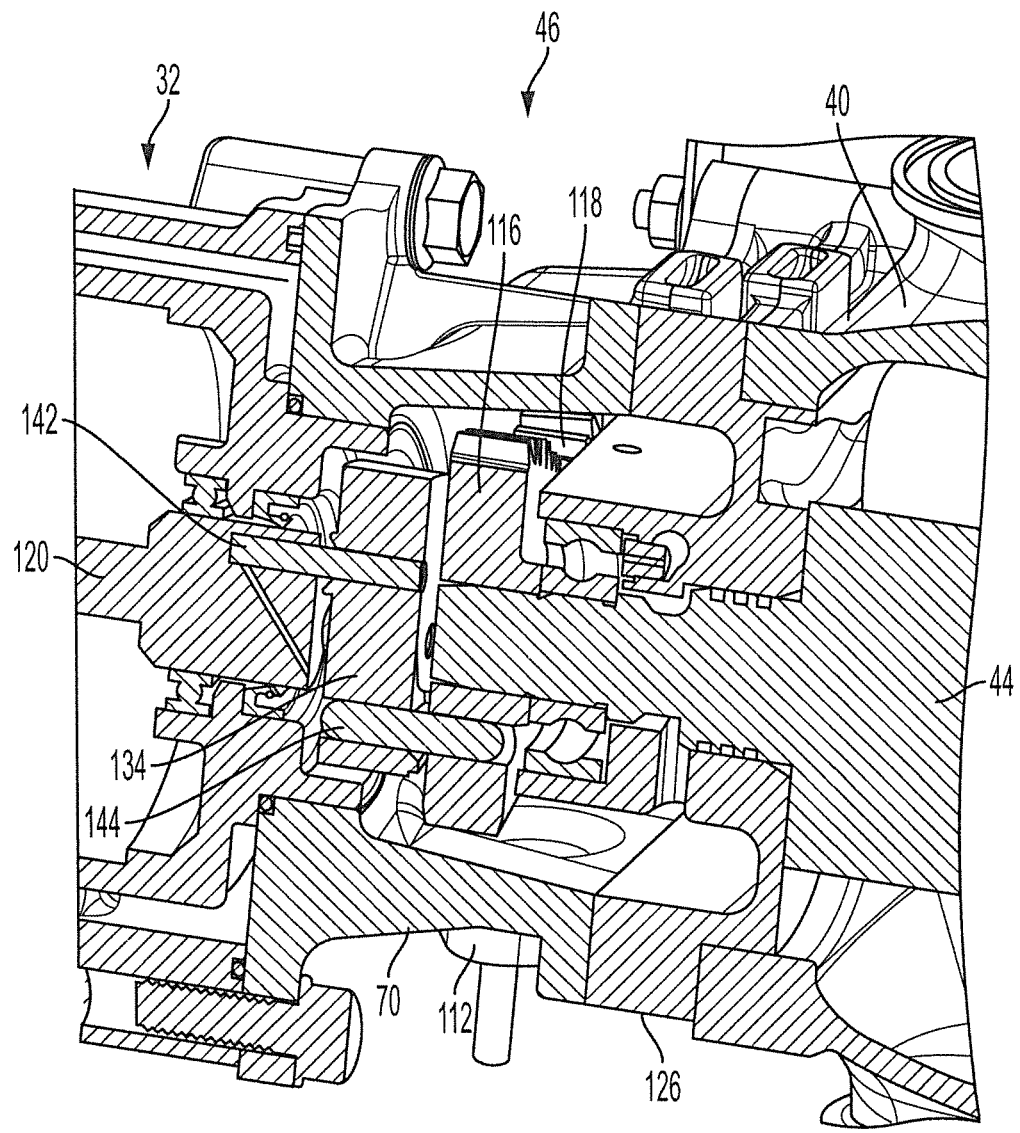
FIG. 15 is a partial sectional view of an EGR pump, motor and transmission assembly detailing an insulated coupling.

Referring to FIGS. 1, 10 and 14, the exhaust gas recirculation pump system 30 includes a transmission assembly 46 that includes a drive gear 116 that is meshed with a driven gear 118. The drive gear 116 is coupled to a drive shaft 120 of the electric motor 34 and to a rotor shaft 80, as will be described in more detail below. The driven gear 118 is meshed with the drive gear 116 and is coupled to the other rotor shaft 80. The housing 40 includes angled transmission oil inlet 122 formed therein directing oil to the meshing of the drive gear 116 and the driven gear 118.

Figure 11:
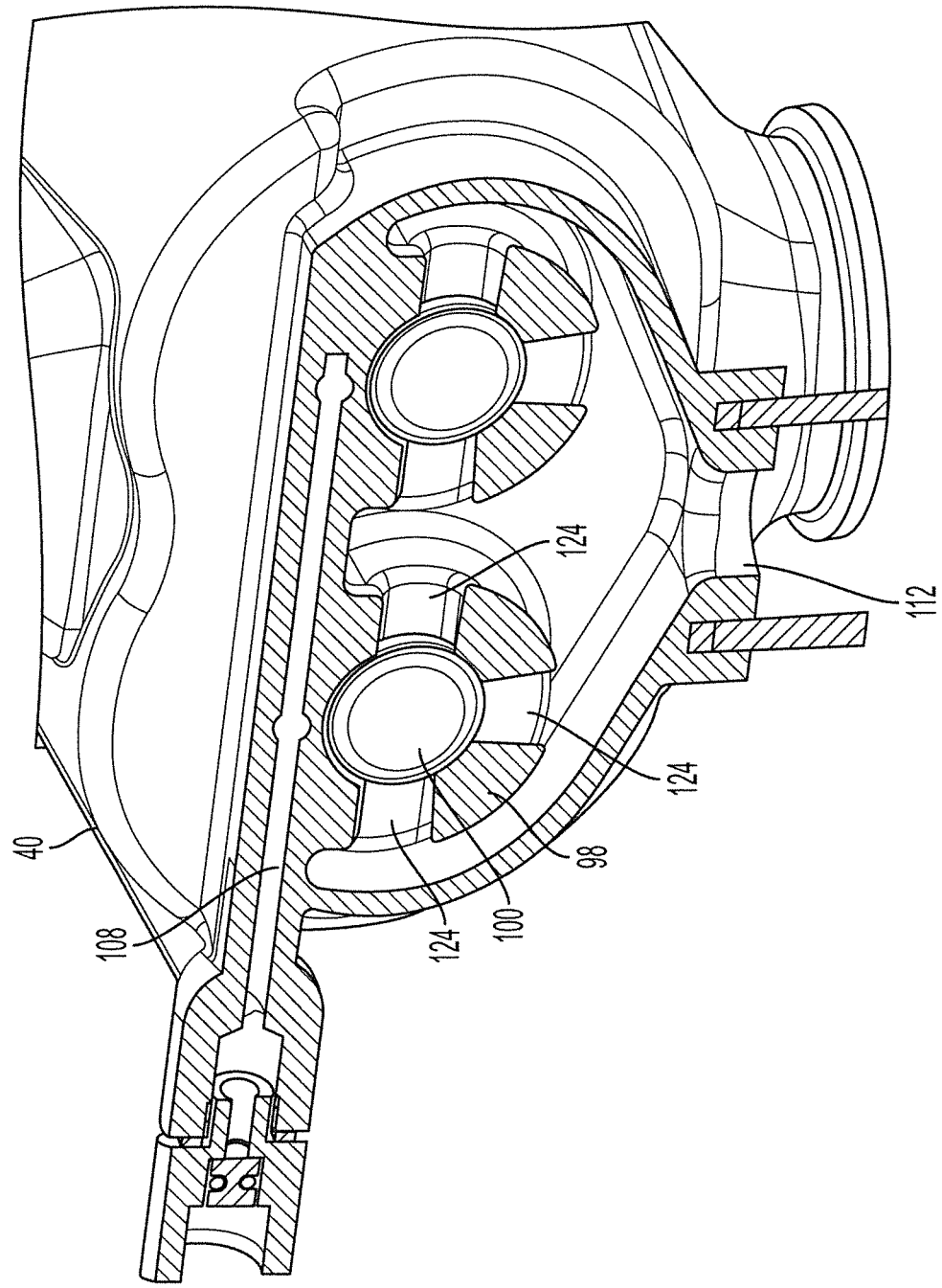
FIG. 11 is a partial cut away perspective view of an EGR pump detailing an oil cavity and oil ports.
Figure 12:
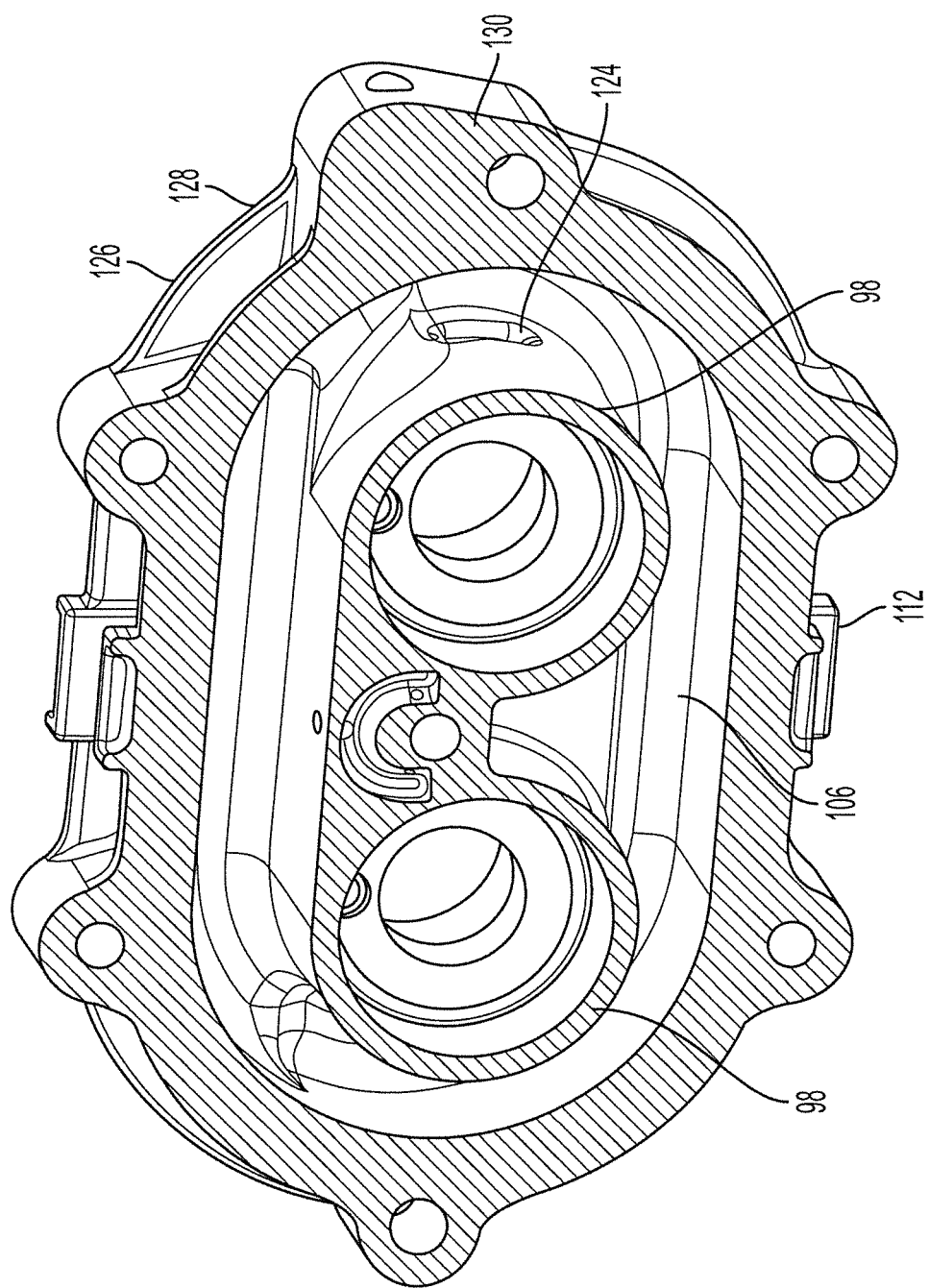
FIG. 12 is a partial perspective view of a bearing plate detailing an oil cavity.
Figure 13:
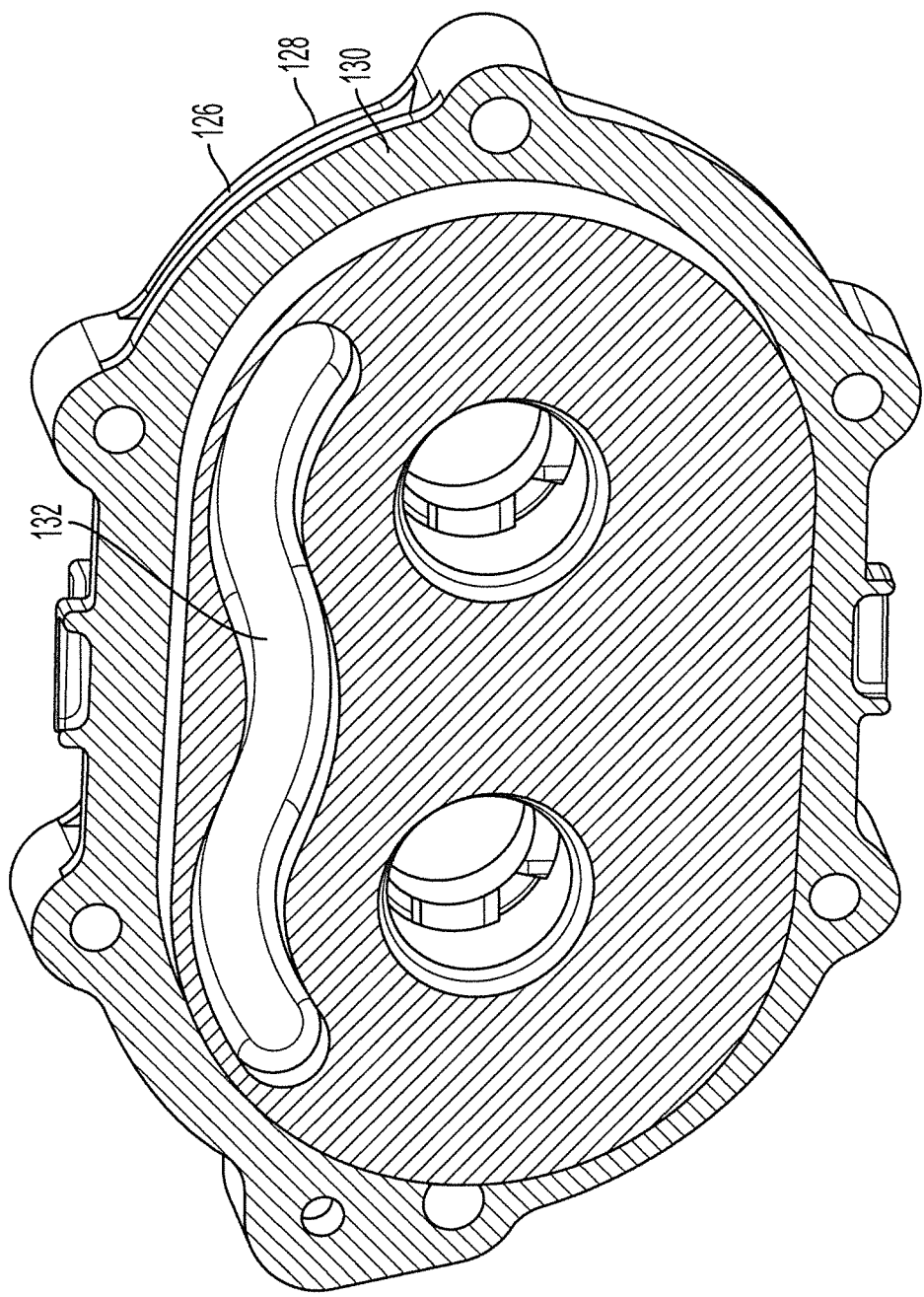
FIG. 13 is a partial perspective view of a bearing plate detailing a Back flow port.

Referring to FIG. 11, the housing 40 includes journals 98 formed therein receiving bearings 100 that support the rotors 44. The journals 98 formed on the housing include a plurality of bearing oil outlets 124 formed therein, with three shown in the depicted embodiment. The bearing oil outlets 124 allow oil to exit the bearings 100 to be routed to the oil outlets 112 formed in the housing 40.

Referring to FIGS. 1-2 and 12-13, the exhaust gas recirculation pump system 30 includes a bearing plate 126 attached to the housing 40. The bearing plate 126 includes bearing plate inner and outer surfaces 128, 130. The bearing plate inner surface 128 includes a back flow port 132 formed therein as described above with respect to the housing 40 and faces a rotor end face. The bearing plate 126 outer surface 130 includes journals 98 formed therein receiving bearings 100 as described above with the housing 40. The bearing plate outer surface 130 includes an oil cavity 106 formed therein.

The bearing plate 126 includes journals 98 formed therein receiving bearings 100 that support the rotors 44. The journals 98 formed on the bearing plate include a plurality of bearing oil outlets 124 formed therein, as described above. The bearing oil outlets 124 allow oil to exit the bearings 100 to be routed to the oil outlet 112 formed in the bearing plate 126 and gear box housing 70.

Referring to FIGS. 15-18, the exhaust gas recirculation pump system 30 includes an insulated coupling 134 joining a rotor shaft 80 to an electric motor shaft 136. The insulated coupling 134 prevents heat transfer from the housing 40 to the electric motor 34. In one aspect, the insulated coupling 134 is formed of PEEK or may be formed of other materials such as plastic composites or ceramic insulating type materials.

In one aspect, the insulated coupling 134 includes a disk shaped body 138 having a plurality of through holes 140. Pins 142 formed on the electric motor shaft 136 are received in a portion of the through holes 140 and pins 144 formed on a drive gear 116 of the transmission assembly 46 are received in another portion of the through holes 140. The insulated coupling 134 connects the electric motor 34 to the rotors 44 and prevents heat transfer.

Alternatively, the insulated coupling 134 may include a pentagonal body having an inner bore formed therein. The pentagonal body may include a flange formed on one end. The inner bore may be sized to receive an end of the rotor shaft which has a complementary shape and size. The outer shape of the pentagonal body may be received in a corresponding drive bore formed on the drive shaft of the electric motor. In this manner the drive shaft is thermally isolated and coupled to the rotor shaft.

Figure 17:
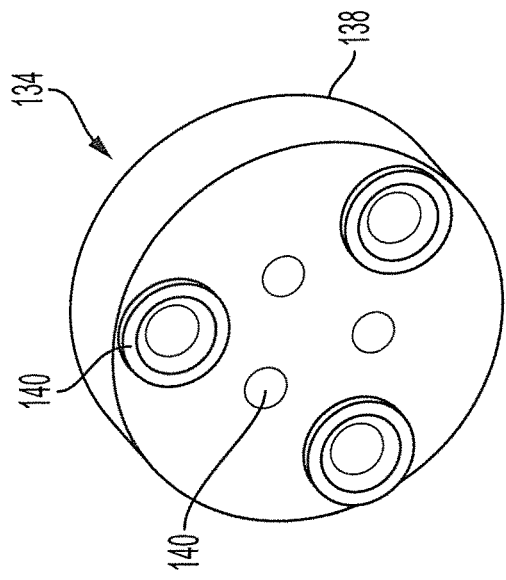
FIG. 17 is a perspective view of a coupling for linking the motor and rotor.
Figure 16:
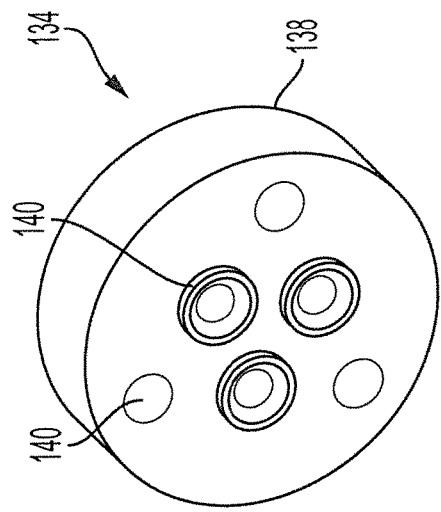
FIG. 16 is a perspective view of a coupling for linking the motor and rotor.

Referring to FIG. 17, there is shown a control structure 200 of the EGR pump system 30. The control structure 200 includes sensors 202 that are in communication with the engine 204, electric motor 34, EGR pump or Roots device 38 and an EGR control unit 206. The control structure 200 includes sensors 202 capable of sensing conditions and of sending signals, such as temperature, pressure, speed, air flow, mass flow or volumetric flow. The control structure 200 also includes a control unit 206 which includes a computer processor, communication ports, memory, and programming and is linked with the sensors 202. The control unit 206 may be a portion of an engine control unit (ECU). The arrows indicate communication between the various components of the control structure.

The control structure 200 may be utilized in a method of operating the exhaust gas recirculation pump for an internal combustion engine to provide a desired flow of EGR to the engine 204. The EGR control unit 206 may regulate the motor speed or torque in a feedback loop to control an EGR mass flow rate to the engine. The EGR control unit 206 may monitor a current of the electric motor 34 for diagnostic and prognostic evaluation.

The mass flow rate may be calculated by the following equations:

$$\text{volumetric flow rate} = \text{volumetric efficiency} \times \text{displacement} \times \text{speed}$$

$$\text{density} = \text{pressure}/(\text{specific gas constant} \times \text{temperature})$$

$$\text{mass flow rate} = \text{volumetric flow rate} \times \text{density}$$

$$\rho = P/(R \times T)$$

$$m' = V' \times \rho$$

Combined equations:

$$\text{mass flow rate} = (\text{volumetric efficiency} \times \text{displacement} \times \text{speed} \times \text{pressure})/(\text{specific gas constant} \times \text{temperature})$$

$$m' = (VE \times \text{displacement} \times \omega \times P)/(R \times T)$$

The EGR control unit 206 may also detect when a negative torque is being applied to the electric motor 34. This may indicate that the pressure differential across the EGR pump is tending to drive the electric motor 34. In this state, the electric motor may switch to a generator function such that electricity may be stored in a storage device on a vehicle.

Figure 18:
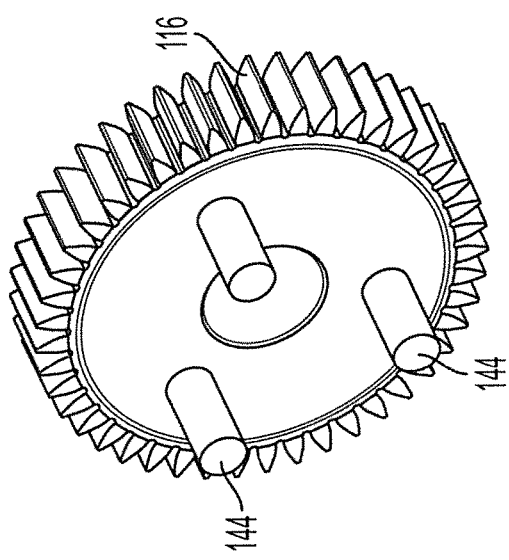
FIG. 18 is a perspective view of a transmission gear for linking the motor and rotor.

As shown in FIG. 18, the control method includes the steps of: providing an EGR pump assembly including an electric motor coupled to a roots device having rotors, the EGR pump operably connected to an internal combustion engine; providing an EGR control unit linked to the EGR pump assembly; providing sensors linked to the EGR control unit; determining if a motor speed is within a predetermined target in step S1 wherein when motor speed=predetermined target then; determining if a motor torque is within a predetermined target in step S2 wherein when motor torque=predetermined target then; determining if a motor temperature is within a predetermined target in step S3 wherein when motor temperature=predetermined target then; maintaining operation of the exhaust gas recirculation pump.

The method of operating the exhaust gas recirculation pump includes the step of determining the motor speed S1 including determining that the motor speed is not equal to the predetermined target and then including the step S4 of determining whether a motor speed is less than the predetermined target.

The method of operating the exhaust gas recirculation pump includes the step of wherein in step S4 the motor speed is not less than the predetermined target then including the step S5 of indicating an excessive engine delta P.

The method of operating the exhaust gas recirculation pump includes the step of the step S2 includes determining that the motor torque is not equal to the predetermined target and then including the step S6 of determining whether a motor torque is greater than the predetermined target.

The method of operating the exhaust gas recirculation pump includes the step of wherein in step S6 the motor torque is not greater than the predetermined target then including the step S7 of flagging a low torque.

The method of operating the exhaust gas recirculation pump includes the step of wherein in step S6 the motor torque is greater than the predetermined target then including the step S8 of flagging an excessive torque.

The method of operating the exhaust gas recirculation pump includes the step of wherein the step of determining the motor temperature S3 includes determining that the motor temperature is not equal to the predetermined target and then including the step S9 of flagging a motor temperature.

The method of operating the exhaust gas recirculation pump includes the step of wherein in step S4 the motor speed is less than the predetermined target including the step S10 of determining if the motor torque is greater than the predetermined target.

The method of operating the exhaust gas recirculation pump includes the step of wherein in step S10 the torque is not greater than the predetermined target including the step S1 of flagging a low torque and low speed.

The method of operating the exhaust gas recirculation pump includes the step of wherein in step S10 the torque is greater than the predetermined target including the step S12 of determining if the speed is equal to zero.

The method of operating the exhaust gas recirculation pump includes the step of wherein the speed is equal to zero then including the step S13 of indicating pump seizure.

The method of operating the exhaust gas recirculation pump includes the step of wherein the speed is not equal to zero then including the step S8 of flagging an excessive torque.

Figure 19:
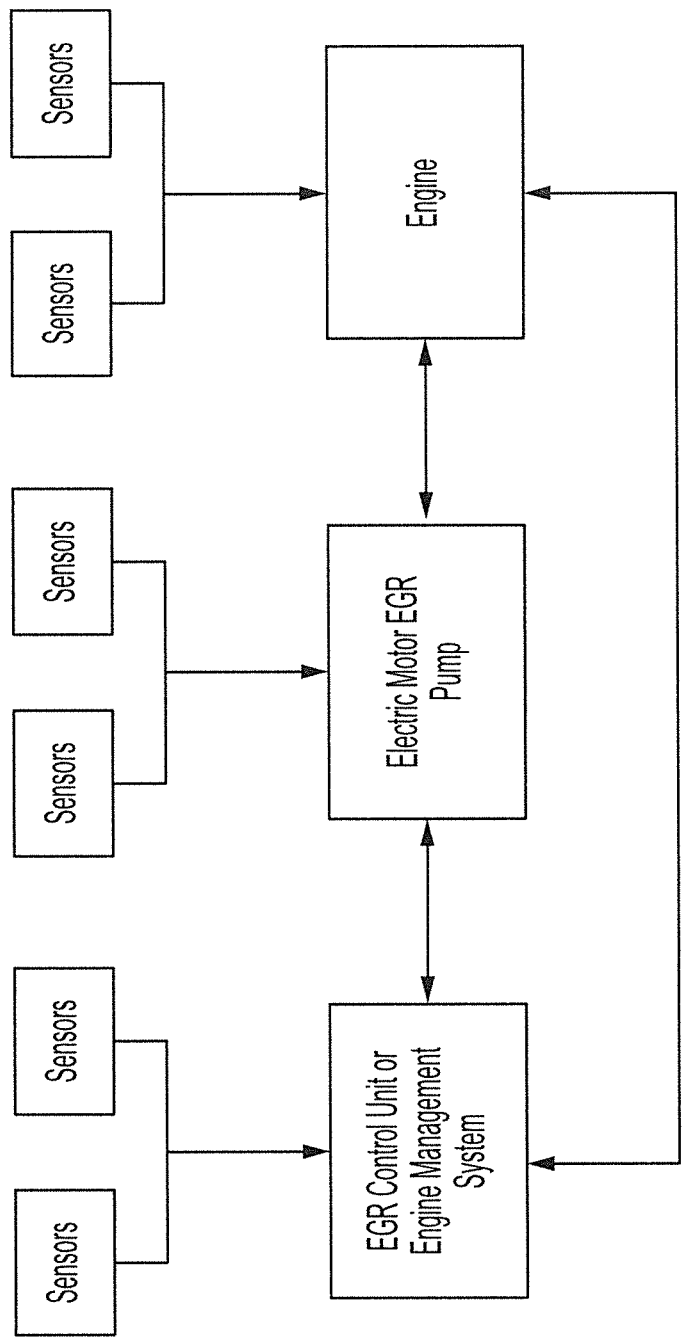
FIG. 19 is a diagram of an EGR system detailing an engine, sensors, EGR pump and motor and an EGR control unit.

As shown in FIG. 19, the method of operating the exhaust gas recirculation pump includes the step of further including the step of performing an engine shut down S14 and determining if the temperature is less than 5 degrees C. in step S15.

The method of operating the exhaust gas recirculation pump includes the step of wherein in step S15 the temperature is less than 5 degrees C. and including the step S16 of moving the rotors.

Figure 20:
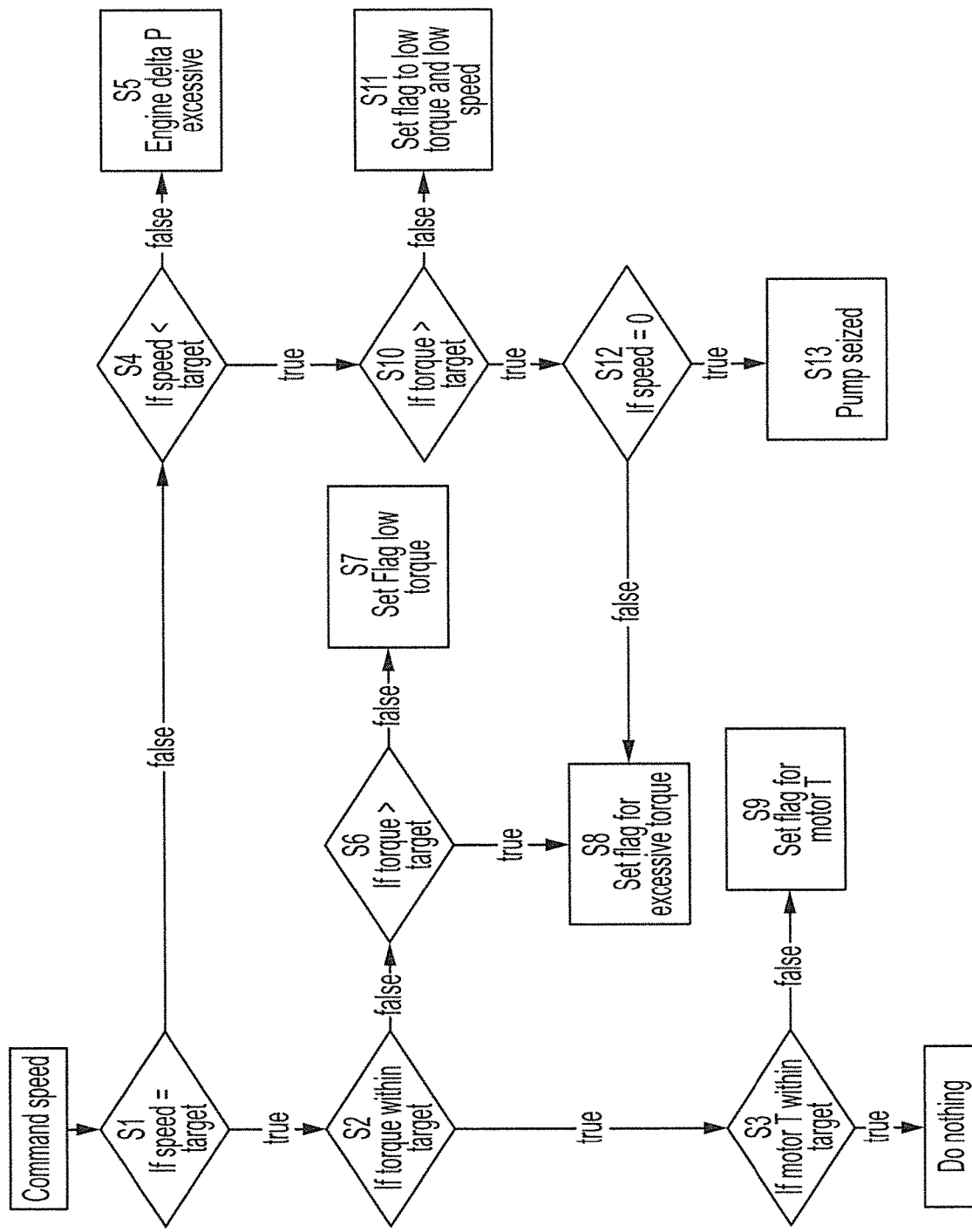
FIG. 20 is a diagram of an EGR control system.
Figures 21, 22:
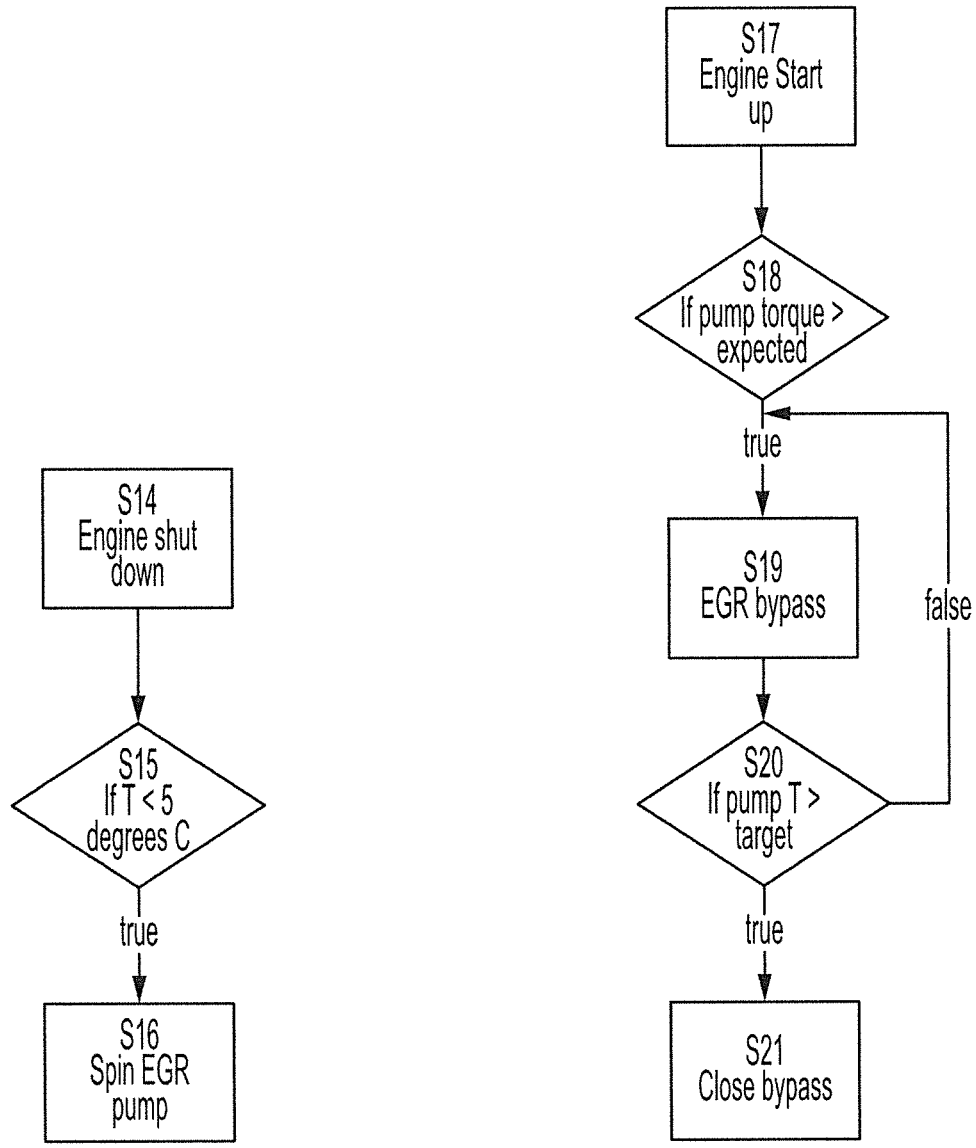
FIG. 21 is a diagram of an EGR control system at engine shut down.
FIG. 22 is a diagram of an EGR control system at engine start up.

As shown in FIG. 20, the method of operating the exhaust gas recirculation pump includes the step of further including the step of performing an engine start up S17 and the step S18 of determining if the toque is greater than the predetermined target.

The method of operating the exhaust gas recirculation pump includes the step of wherein in step S18 the toque is greater than the predetermined target and including the step S19 of opening an EGR bypass to heat the EGR pump and the step S20 of determining if the temperature is greater than the predetermined target. An additional step of rotating the rotors alternatively clockwise and counter clock wise may be performed to free the rotors from a potential blockage.

The method of operating the exhaust gas recirculation pump includes the step of wherein in step S20 the temperature is greater than the predetermined target and including the step S21 of closing an EGR bypass.

Various actions may be performed when a particular condition is flagged. When the low torque is flagged the EGR controller may indicate that there is a potential mechanical failure with a portion of the EGR pump such that torque is not being transferred correctly. The EGR controller may warn an operator to check the EGR pump for a broken coupling between the electric motor and the pump. When the motor temperature is flagged the EGR controller may command a drop in power to the electric motor to cool down the motor. When the excessive torque is flagged the EGR controller may indicate that there is a potential mechanical failure with a portion of the EGR pump. Such a failure may be associated with the bearings or rotors. The EGR controller may warn the operator that the pump is becoming clogged with soot or experiencing bearing failure, and reduce power until an acceptable limit has been reached. When the low torque and low speed is flagged the EGR controller may indicate that there is a potential problem with e electrical motor. It should be realized that various other actions may be taken depending on the type of engine and various inputs.

We claim:

1. A method of operating an exhaust gas recirculation (EGR) pump for an internal combustion engine comprising:
providing an EGR pump assembly including an electric motor coupled to a roots device having rotors, the EGR pump operably connected to an internal combustion engine;
providing an EGR control unit linked to the EGR pump assembly;
providing sensors linked to the EGR control unit;
determining if a motor speed equals a predetermined target, wherein, when the motor speed equals the predetermined target then;
determining if a motor torque equals a predetermined target, wherein, when the motor torque equals the predetermined target then;
determining if a motor temperature equals a predetermined target, wherein, when the motor temperature equals the predetermined target then;

maintaining operation of the exhaust gas recirculation pump.

2. The method of operating an exhaust gas recirculation pump of claim 1, wherein, if the motor speed is not equal to the predetermined target, then including a step of determining whether the motor speed is less than the predetermined target.

3. The method of operating an exhaust gas recirculation pump of claim 2, wherein if the motor speed is not less than the predetermined target, then including a step of indicating an excessive engine delta P.

4. The method of operating an exhaust gas recirculation pump of claim 1, wherein if the motor torque is not equal to the predetermined target, then including a step of determining whether the motor torque is greater than the predetermined target.

5. The method of operating an exhaust gas recirculation pump of claim wherein if the motor torque is not greater than the predetermined target then including a step of flagging a low torque.

6. The method of operating an exhaust gas recirculation pump of claim 4, wherein if the motor torque is greater than the predetermined target, then including a step of flagging an excessive torque.

7. The method of operating an exhaust gas recirculation pump of claim 1, wherein if the motor temperature is not equal to the predetermined target, then including a step of flagging a motor temperature.

8. The method of operating an exhaust gas recirculation pump of claim 2, wherein if the motor speed is less than the predetermined target, then including a step of determining if the motor torque is greater than the predetermined target.

9. The method of operating an exhaust gas recirculation pump of claim 8, wherein if the motor torque is not greater than the predetermined target, then including a step of flagging a low motor torque and a low motor speed.

10. The method of operating an exhaust gas recirculation pump of claim 8, wherein if the motor torque is greater than the predetermined target, then including a step of determining if the motor speed is equal to zero.

11. The method of operating an exhaust gas recirculation pump of claim 10, wherein if the motor speed is equal to zero, then including a step of indicating pump seizure.

12. The method of operating an exhaust gas recirculation pump of claim 10, wherein if the motor speed is not equal to zero, then including a step of flagging an excessive motor torque.

13. The method of operating an exhaust gas recirculation pump of claim 1, further including the step of performing an engine shut down and determining if the motor temperature is less than 5 degrees C.

14. The method of operating an exhaust gas recirculation pump of claim 13, wherein if the temperature is less than 5 degrees C., then including a step of moving the rotors.

15. The method of operating an exhaust gas recirculation pump of claim 1, further including a step of performing an engine start up and a step of determining if the motor toque is greater than the predetermined target.

16. The method of operating an exhaust gas recirculation pump of claim 15, wherein if the motor torque is greater than the predetermined target, then including a step of opening an EGR bypass and a step of determining if the motor temperature is greater than the predetermined target.

17. The method of operating an exhaust gas recirculation pump of claim 16, wherein if the motor temperature is greater than the predetermined target, then including a step S21 of closing the EGR bypass.

\* \* \* \* \*